T. H. NEAL.
CAR-COACH.
No. 169,569. Patented Nov. 2, 1875.
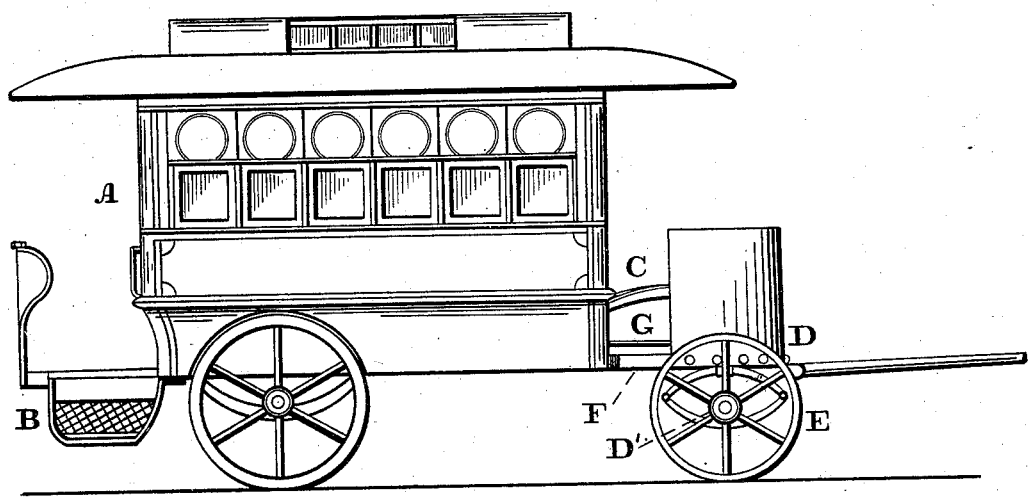
Fig. 1.
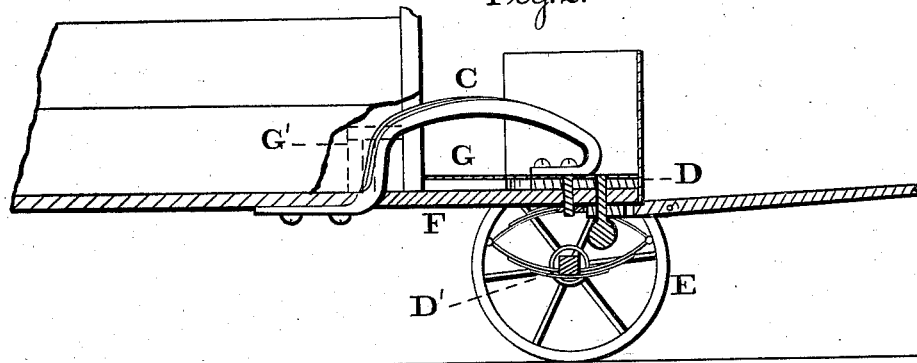
Fig. 2.
Fig. 4. Fig. 3. Fig. 5.
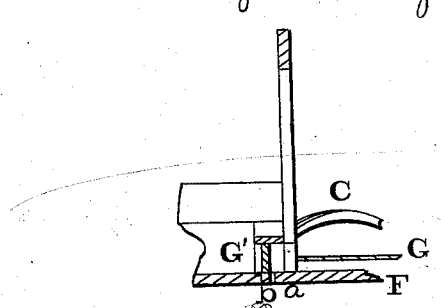
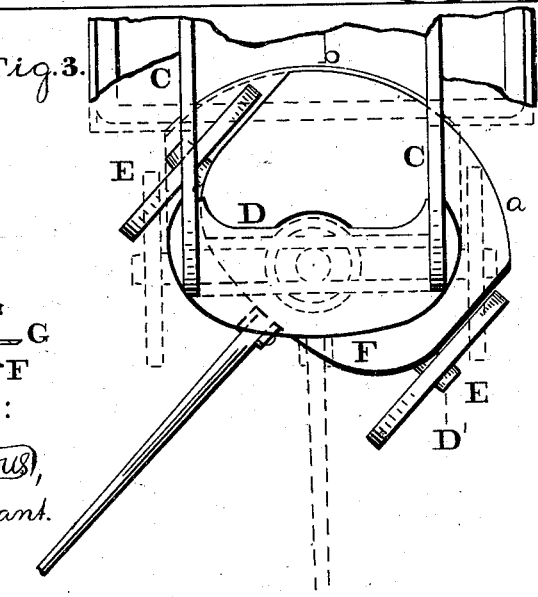
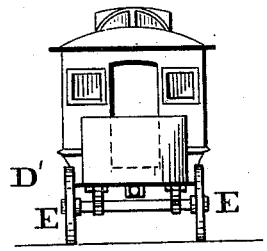
Witnesses:
L. F. Brous,
A. P. Grant.
Inventor:
Thomas H. Neal
by John A. Sudersheim
Att'y.

UNITED STATES PATENT OFFICE.

THOMAS H. NEAL, OF PHILADELPHIA, PENNSYLVANIA.

IMPROVEMENT IN CAR-COACHES.

Specification forming part of Letters Patent No. 169,569, dated November 2, 1875; application filed March 20, 1875.

*To all whom it may concern:*

Be it known that I, THOMAS H. NEAL, of the city and county of Philadelphia and State of Pennsylvania, have invented a new and useful Improvement in Car-Coaches; and I do hereby declare the following to be a clear and exact description of the nature thereof, sufficient to enable others skilled in the art to which my invention appertains to fully understand, make, and use the same, reference being had to the accompanying drawings making part of this specification, in which—

Figure 1 is a side view of the device embodying my invention. Fig. 2 is a longitudinal vertical section of a portion thereof. Fig. 3 is a top or plan view. Fig. 4 is a longitudinal vertical section of a portion thereof. Fig. 5 is a front view.

Similar letters of reference indicate corresponding parts in the several figures.

My invention has for its object a conveyance which possesses the advantages of a street-car and coach or cab.

The car-coach has a door in front, and a front platform which is suspended from the body of the coach by means of curved springs, whereby access is readily had to and from the platform, the wheels turn short under the springs, the platform sets easy, and high seats of coaches are dispensed with.

The car-coach will be hung low and have suitable steps, whereby passengers can conveniently enter and leave the coach in a manner similar to a street-car, and provision is made for comfortably seating the passengers. The sill of the front doorway is so elevated that the front wheels may turn thereunder without interference of or interfering with said sill, which also overhangs the wheels and prevents them striking the driver, and likewise provides means for passing to and from the platform. To the axle of the front wheels there is connected a platform, which closes the space between the platform and front of the coach, and moves with the axle so as to permit the wheels to turn properly under the front of the coach.

Referring to the drawings, A represents the body of a coach to which passengers have access through the rear door by means of steps B, similar to a street-car. From the forward end of the body A there is suspended, by means of springs C C, a platform, D, to which is jointed the axle D' of the front wheels E. The springs C are of arched or bow form, and one end of each spring is connected to the body of the coach and the other end to the platform D, so that a space is afforded under the arch or bow of each spring for the turning or swinging of the front wheels, as more readily seen in Fig. 3. The axle of the front wheels is secured to a platform, F, through which passes the king-bolt or axis of the front wheel. The rear line $a$ of this platform is the arc of a circle whose center is the axis of the front wheel. The lower part $b$ of the forward end of the body A is also formed of the arc of a circle, which coincides with the arc $a$ of the platform, the two arcs coming closely together, and the platform F thereby occupying the space between the platform D and front of the body A. The platform D supports an upper or auxiliary platform, G, on which the driver will stand, although he may occupy a position on the rotary platform F. The body A will have a door in front, whereby access is had to and from the platform D, and below the doorway there is a sill, G', (see Fig. 4 and dotted lines Fig. 2,) which overhangs the arc or curved portion $b$ of the portion of the body below it, so that provision is made to permit the passage of the wheels when they turn or swing laterally, and prevent the driver or persons on the platform being struck by the wheels. Said sill also affords means for stepping to and from the body of the coach from and to the platform D.

It will be seen that the platform D is mounted on the front wheels, whose axle has an axis on said platform. This permits the driver to direct or guide the coach similar to an ordinary cab or coach, thus dispensing with the elevated seat, that the driver may sit or stand, as desired. The location of the platform also provides convenient means for the driver passing into the coach and attending to the passengers, thus dispensing with the services of a conductor. The platform F rotates with the axle of the front wheels and closes the space between the platform D and body A, as has been stated. The platform D will hang easily on the suspension-springs C and be firmly supported thereby, and the axle of the front wheels is permitted to move quickly, so as to make short turns.

The coach has all the advantages of a street-car, and may be constructed strong and light. The passengers have easy means of entering and leaving the car, and will be comfortably seated therein. The driver is conveniently situated for perceiving and being perceived by the passengers.

Having thus described my invention, what I claim as new, and desire to secure by Letters Patent, is—

1. The combination of a coach-body having a front door with a driver's platform, D, and curved springs C, substantially as and for the purpose set forth.

2. The combination of a coach-body having a front door with the platform D, curved suspension-springs C, the platform F, having arc $a$ and arc $b$ on the body, substantially as and for the purpose set forth.

3. The combination of the suspended platform D, curved springs C, rotary platform F, having arc $a$, the body of the coach having arc $b$ and overhanging sill G', and the stationary platform G, substantially as and for the purpose set forth.

T. H. NEAL.

Witnesses:
JOHN A. WIEDERSHEIM,
A. P. GRANT.